United States Patent
Niu et al.

(10) Patent No.: US 12,027,857 B2
(45) Date of Patent: Jul. 2, 2024

(54) METHOD FOR CONTROLLING PEAK SAVING BY WIND POWER GRID

(71) Applicants: STATE GRID GANSU ELECTRIC POWER RESEARCH INSTITUTE, Gansu (CN); STATE GRID GANSU ELECTRIC POWER COMPANY, Gansu (CN); State Grid Qinghai Electric Power Research Institute, Qinghai (CN); State Grid Qinghai Electric Power Company, Qinghai (CN); State Grid Corporation of China, Beijing (CN)

(72) Inventors: Jien Niu, Gansu (CN); Qiang Zhou, Gansu (CN); Yanqi Zhang, Gansu (CN); Junhong Duan, Gansu (CN); Long Zhao, Gansu (CN); Diangang Hu, Gansu (CN); Jianjun Wu, Gansu (CN); Jinping Zhang, Gansu (CN); Zhicheng Ma, Gansu (CN); Xushan Han, Gansu (CN); Jun Song, Gansu (CN); Qingquan Lv, Gansu (CN); Ruixiao Zhang, Gansu (CN); Yanhong Ma, Gansu (CN); Jianmei Zhang, Gansu (CN); Guodong Wu, Gansu (CN); Pengfei Gao, Gansu (CN); Chengjia Bao, Gansu (CN); Weicheng Shen, Gansu (CN); Jin Li, Gansu (CN); Kequan Liu, Gansu (CN); Xiaodong Pang, Gansu (CN)

(73) Assignees: STATE GRID GANSU ELECTRIC POWER RESEARCH INSTITUTE, Lanzhou (CN); STATE GRID GANSU ELECTRIC POWER COMPANY, Lanzhou (CN); State Grid Qinghai Electric Power Research Institute, Xining (CN); State Grid Qinghai Electric Power Company, Xining (CN); State Grid Corporation of China, Beijing (CN)

( * ) Notice: Subject to any disclaimer, the term of this patent is extended or adjusted under 35 U.S.C. 154(b) by 322 days.

(21) Appl. No.: 17/372,458

(22) Filed: Jul. 10, 2021

(65) Prior Publication Data
US 2022/0037884 A1 Feb. 3, 2022

Related U.S. Application Data

(63) Continuation of application No. PCT/CN2021/099423, filed on Jun. 10, 2021.

(30) Foreign Application Priority Data

Jul. 30, 2020 (CN) .......................... 202010748432.6

(51) Int. Cl.
*H02J 3/00* (2006.01)
*G05B 13/04* (2006.01)
(Continued)

(52) U.S. Cl.
CPC .......... *H02J 3/0012* (2020.01); *G05B 13/042* (2013.01); *G06N 3/126* (2013.01); *H02J 13/00002* (2020.01)

(58) Field of Classification Search
CPC ............... H02J 3/0012; H02J 13/00002; H02J 2300/28; H02J 2310/60; H02J 3/004;
(Continued)

(56) References Cited

U.S. PATENT DOCUMENTS 10,443,577 B2 * 10/2019 Swaminathan .......... F03D 7/047
10,637,288 B2 * 4/2020 Shim ................. H02J 13/00002
(Continued)

OTHER PUBLICATIONS

Jian Wang et al., Research on Demand Response Mechanism of Wind Power Local Accommodation Utilizing Energy-Intensive Loads, Power System Technology, Jul. 2017, pp. 2115-2123, vol. 41, No. 7.
(Continued)

*Primary Examiner* — Ramesh B Patel

(57) ABSTRACT

A method for controlling peak saving by wind power grid. The method includes: S1: evaluating dispatchability of a
(Continued)

cluster virtual wind power unit; S2: developing a method for calculating a dispatchability index of the cluster virtual wind power unit; S3: analyzing a source-load peak-shaving resource strategy; and S4: distributing a control strategy for tie-line peak shaving. The present disclosure has the following beneficial effects: In the present disclosure, real-time dispatchability of wind power participating in real-time power balance is first analyzed, specific evaluation indexes and calculation methods are provided, and calculation examples are given for verification. Then, an optimized real-time dispatch strategy is provided based on demand-side response resources, and DC and AC tie-lines are coordinated for operation. The peak shaving control method for emergent source-grid coordination when a sending-end power grid is faulty can ensure normal operation.

1 Claim, 1 Drawing Sheet

(51) Int. Cl.
  *G06N 3/12* (2023.01)
  *G06N 3/126* (2023.01)
  *H02J 13/00* (2006.01)

(58) Field of Classification Search
  CPC ...... H02J 3/14; H02J 2203/20; G05B 13/042; G06N 3/126; G06N 7/01; Y02B 70/3225; Y02B 90/20; Y02E 60/00; Y04S 20/00; Y04S 20/222; Y04S 40/20
  See application file for complete search history.

(56) References Cited

U.S. PATENT DOCUMENTS

| | | | | |
|---|---|---|---|---|
| 11,025,091 | B2* | 6/2021 | Shim | H02J 9/061 |
| 2011/0106321 | A1* | 5/2011 | Cherian | H02J 13/00034 |
| | | | | 700/286 |
| 2012/0029897 | A1* | 2/2012 | Cherian | H02J 13/00028 |
| | | | | 703/18 |
| 2015/0094968 | A1* | 4/2015 | Jia | G05B 15/02 |
| | | | | 702/60 |
| 2015/0318705 | A1* | 11/2015 | Lucas | H02J 3/46 |
| | | | | 307/129 |
| 2017/0016430 | A1* | 1/2017 | Swaminathan | G06Q 50/06 |
| 2019/0052083 | A1* | 2/2019 | Lucas, Jr. | H02J 3/46 |
| 2020/0176997 | A1* | 6/2020 | Sachs | H02P 6/17 |

OTHER PUBLICATIONS

Xi Ye et al., Time-varying Probabilistic Model and Dispatch Performance Indices for Wind Farm Cluster Virtual Power Generator—Part I: Time-varying Probabilistic Model, Proceedings of the CSEE, Oct. 20, 2015, pp. 5135-5146, vol. 35, No. 20.

Xi Ye et al., Time-varying Probabilistic Model and Dispatch Performance Indices for Wind Farm Cluster Virtual Power Generator—Part II: Dispatch Performance Indices, Proceedings of the CSEE, Nov. 5, 2015, pp. 5395-5404, vol. 35, No. 21.

* cited by examiner

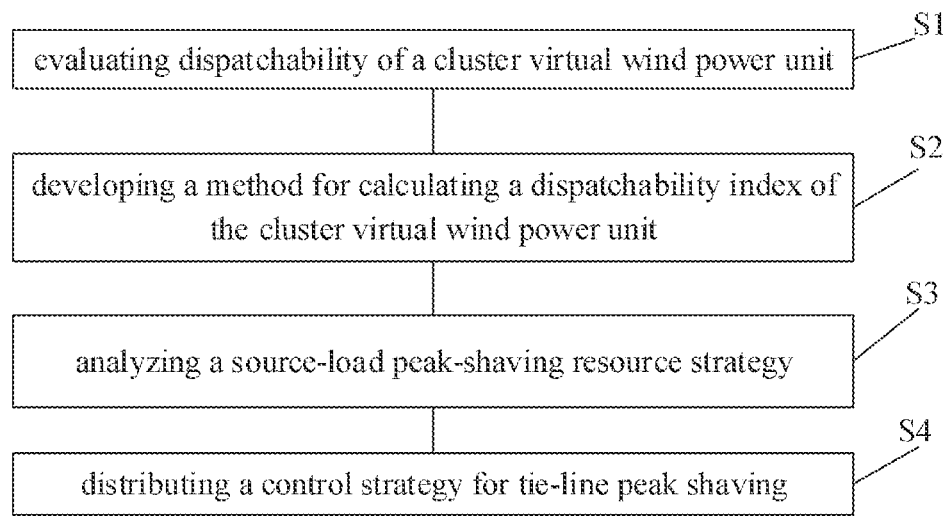

METHOD FOR CONTROLLING PEAK SAVING BY WIND POWER GRID

CROSS REFERENCE TO RELATED APPLICATIONS

The present application is a Continuation Application of PCT Application No. PCT/CN2021/099423 filed on Jun. 10, 2021, which claims the benefit of Chinese Patent Application No. 202010748432.6 filed on Jul. 30, 2020. All the above are hereby incorporated by reference in their entirety.

TECHNICAL FIELD

The present disclosure relates to a peak shaving control method for coordination, and in particular, to a method for controlling peak saving by wind power grid, and relates to the technical field of electrical engineering.

BACKGROUND

In a high-proportion renewable energy system, wind power/photovoltaic power is usually involved in the dispatch of the system in a passive form of "negative load". In this case, a power system needs to provide a large amount of flexible resources to satisfy fluctuation of the wind power/photovoltaic power and promote their utilization. When a peak-shaving power supply of the system encounters an emergency such as unplanned outage, peak shaving shortage occurs in the system. As a "fluctuating energy supply unit", wind power/photovoltaic power may also provide a peak shaving capability in a system emergency. Different from thermal power and other conventional units with stable and controllable output, wind power/photovoltaic power features randomness and fluctuation. Therefore, it is necessary to study and quantitatively evaluate dispatchable output of wind power/photovoltaic power, and calculate the peak shaving capability of the wind power/photovoltaic power for the system.

SUMMARY

An objective of the present disclosure is to provide a peak shaving control method for emergent source-grid coordination in case of a faulty sending-end power grid, so as to resolve the problem mentioned in BACKGROUND.

To achieve the objective, the present disclosure provides the following technical solution: a peak shaving control method for emergent source-grid coordination in case of a faulty sending-end power grid. The method includes the following steps:
S1: evaluating dispatchability of a cluster virtual wind power unit;
S2: developing a method for calculating a dispatchability index of the cluster virtual wind power unit;
S3: analyzing a source-load peak-shaving resource strategy; and
S4: distributing a control strategy for tie-line peak shaving.

In a preferred technical solution of the present disclosure, the evaluation method in step S1 includes:
a1: conducting statistical analysis on probability distributions of wind power characteristics and a time-varying characteristic of a correlation coefficient, where the wind power characteristics concerned include fluctuation and uncertainty, and fluctuation $\Delta P^{VPG}(t)$ and uncertainty $\varepsilon^{VPG}(t)$ of a wind cluster virtual power generation unit (WVPG) may be expressed as:

$$\Delta P^{VPG}(t) = \sum_{i=1}^{n_k} \Delta P_i^w(t) \text{ and} \quad (1)$$

$$E^{VPG}(t) = \sum_{i=1}^{n_k} \varepsilon_i^w(t)$$

where $n_k$ denotes the number of wind farms in the WVPG, t denotes time, $\Delta P_i^W(t)$ denotes fluctuating power of an ith wind farm, and $\varepsilon_i^W(t)$ denotes uncertainty of the ith wind farm;
a2: establishing a model set based on a marginal probability distribution and an offline condition of a rank correlation coefficient matrix, including the following steps:
a2.1: establishing an offline model set of conditional probability distributions of fluctuation $\Delta P_i^W(t)$ and uncertainty $\varepsilon_i^W(t)$ of each wind farm in the WVPG;
a2.2: establishing an offline model set of conditional rank correlation coefficient matrixes $\mathcal{R}_\varepsilon^{VPG}$, $\mathcal{R}_{\Delta P}^{VPG}$ of a cumulative probability distribution function of fluctuation $\Delta P_i^W(t)$ and uncertainty $\varepsilon_i^W(t)$ among a plurality of wind farms in the WVPG;
a2.3: establishing in a rolling manner, by using a Monte Carlo simulation method based on a genetic algorithm, conditional probability distributions of the WVPG and each wind farm in the WVPG at each moment under a joint constraint of a marginal conditional probability distribution of each wind farm and conditional rank correlation coefficient matrixes of the plurality of wind farms; and
a3: conducting online sampling and calculation based on a time-varying probability distribution of the WVPG, including the following steps:
a3.1: conducting initialization, and randomly generating S $n_s \times n_k$-order matrixes as an initial population of the genetic algorithm, where $n_s$ denotes a sampling scale, $n_k$ denotes the number of wind farms in the WVPG, and matrix elements are random numbers evenly distributed within [0,1];
a3.2: selecting a rank correlation coefficient matrix from the offline model set; first predicting a wind direction based on wind farms i and j at moment t, and calculating a wind direction difference coefficient; setting $(\tilde{F}_{\varepsilon,i,m}, \tilde{F}_{\varepsilon,j,m})$ as a data pair including elements in ith and jth columns in an mth random matrix, where $m \in (1, 2, \ldots, S)$; grouping data pairs in $(\tilde{F}_{\varepsilon,i,m}, \tilde{F}_{\varepsilon,j,m})$ into several subsets; setting $\tilde{\mathcal{R}}_{\varepsilon,ij,c}$ as a rank correlation coefficient calculated based on elements in a cth subset of wind farms i and j in the mth random matrix; setting $\mathcal{R}_\varepsilon R_{\varepsilon,ij,c}$ as a rank correlation coefficient with the same value as condition set $\tilde{\mathcal{R}}_{\varepsilon,ij,c}$ in the offline model set, where an objective function of an mth matrix $A_m$ may be set as:

$$G(A_m) = \sum_{i=1}^{n_k} \sum_{j=1 \& i \neq j}^{n_k} \sum_{c=1}^{n_C} (\tilde{\mathcal{R}}_{\varepsilon,ij,c} - \mathcal{R}_{\varepsilon,ij,c})^2 \quad (3)$$

where $n_c$ denotes the number of subsets;

a3.3: solving formula (3) by using the genetic algorithm, where elements in the S random matrixes are changed through genetic and mutation operations to allow a rank correlation coefficient matrix of an optimal matrix to approximate to target value $\tilde{\mathcal{R}}_{\varepsilon,ij,c}$, that is, to minimize $G(A_m)$ in formula (3), where the optimal matrix allows $G(A_m)$ to be minimized in each iteration;

a3.4: conducting convergence judgment; setting $A_k^*$ as an optimal matrix of a kth generation of the genetic algorithm and $A_0^*$ as an initial optimal matrix, where in this case, an improvement of the optimal matrix of the kth generation relative to an initial condition is $G(A_k^*) - G(A_0^*)$; in the kth generation, if $|G(A_k^*) - G(A_{k-1}^*)| \leq \sigma |G(A_k^*) - G(A_0^*)|$, genetic algorithm iteration stops, where $\sigma$ denotes a convergence coefficient of the algorithm; otherwise, the process goes back to a3.2;

a3.5: selecting cumulative distribution function $\tilde{F}_{\varepsilon,i}(t)$ corresponding to wind farm i from the offline model set based on a value of an uncertainty condition set of wind farm i at moment t; setting $a_{i,g}^*$ g=1, 2, ..., $n_s$ as a gth element in an ith column of the optimal matrix in a3.4, where in this case, a gth sample of wind farm i is $\tilde{\varepsilon}_{i,g}^{W}(t) = \tilde{F}_{\varepsilon,i}(a_{i,g}^*)$, and a gth sample of the WVPG is $$\tilde{\varepsilon}_g^{VPG}(t) = \sum_{i=1}^{n_k} \tilde{\varepsilon}_{i,g}^W(t);$$

a3.6: checking sample time correlation; and a3.7: collecting statistics about frequency distributions of uncertainty of each wind farm and the WVPG at moment t based on samples, which is an estimate of a discrete probability distribution when the sampling scale $n_s$ is large enough, where in this way, discrete estimates $\tilde{f}_{\varepsilon,i,t,i}^{W}$ and $\tilde{f}_{\varepsilon,t}^{VPG}$ of time-varying probability distributions of uncertainty of wind farm i and the WVPG at moment t can be obtained.

In a preferred technical solution of the present disclosure, the calculation method in step S2 includes:

b1: calculating available power, where the available power is a possible value of actual output of the WVPG at moment t; available power of a thermal power unit is any point value between minimum stable combustion output and installed capacity, and a range of the available power remains unchanged at different moments when the thermal power unit operates online; available power of the WVPG complies with a probability distribution, and a probability distribution of the available power at different moments varies with a predicted power value and an uncertainty probability distribution;

the available power of the WVPG at moment t is defined as formula (4):

$$P_a^{VPG}(t) = p_f^{VPG}(t) + \varepsilon^{VPG}(t) \quad (4)$$

where $P_a^{VPG}(t)$ denotes the available power (in the unit of MW) of the WVPG at moment t and is a random variable, and a corresponding time-varying probability distribution is $\tilde{f}_{\varepsilon,t}^{VPG}$; $p_f^{VPG}(t)$ denotes a predicted power value (MW) of the WVPG at moment t; $\varepsilon^{VPG}(t)$ denotes a random variable (MW) of output uncertainty of the WVPG at moment t, and a corresponding time-varying probability distribution is $\tilde{f}_{\varepsilon,t}^{VPG}$;

the probability distribution of the available power is calculated as follows:

(1) conducting a translation operation on a multi-state probability distribution $\tilde{f}_{\varepsilon,t}^{VPG}$ of uncertainty of the WVPG at moment t, where a translation length is a predicted value $p_f^{VPG}(t)$; respectively setting $\tilde{\varepsilon}_i, \tilde{\varepsilon}'_i$ as values of an ith state of $\tilde{f}_{\varepsilon,t}^{VPG}$ before and after the translation, and $\tilde{P}_{\varepsilon,i}, \tilde{P}'_{\varepsilon,i}$ as corresponding state probabilities, where in this case, $$G(A_m) = \sum_{i=1}^{n_k} \sum_{j=1 \& i \neq j}^{n_k} \sum_{c=1}^{n_C} (\tilde{\mathcal{R}}_{\varepsilon,ij,c} - \mathcal{R}_{\varepsilon,ij,c})^2; \quad (3)$$

(2) conducting downward truncation on the probability distribution after the translation from a point valued 0 based on a fact that the minimum available power of the WVPG is 0, where if values of state 1 to state a of the probability distribution after the translation is less than 0, probability $\tilde{P}''_{\varepsilon 0}$ corresponding to state 0 after the downward truncation is:

$$\tilde{P}''_{\varepsilon 0} = \tilde{P}'_{\varepsilon 0} + \sum_{i=1}^{a} \tilde{P}'_{\varepsilon,i} \quad (5)$$

where $\tilde{P}'_{\varepsilon 0}$ denotes a probability of a multi-state distribution valued 0 before the truncation operation is performed at the point valued 0; if the distribution has no state valued 0 before the truncation, $\tilde{P}_{\varepsilon 0}' = 0$;

b2: calculating available power limits, where the available power limits are the maximum and minimum available power of the WVPG at moment t; an upper limit of output of the thermal power unit is the installed capacity, and a lower limit of the output is the minimum stable combustion output, and the lower and upper limits are fixed values at all moments; the available power limits of the WVPG are upper and lower boundary values of the probability distribution at a certain confidence level, and vary with the probability distribution of the available power;

the upper limit of the available power of the WVPG at moment t is defined as formula (6) based on the value-at-risk theory:

$$p_{max}^{VPG}(t) = \min[a: P\{P_a^{VPG}(t) \leq a\} \geq \beta] \quad (6)$$

where $p_{max}^{VPG}(t)$ denotes the upper limit (MW) of the available power of the WVPG at moment t; $\beta$ denotes a confidence probability; $p_{max}^{VPG}(t)$ means that it is assured with a probability higher than $\beta$ that the available power of the WVPG at moment t is less than or equal to a, and a minimum value of a is the upper limit of output;

the lower limit of the available power of the WVPG at moment t is defined as formula (7):

$$p_{min,k}^{VPG}(t) = \max[b: P\{p_{b,k}^{VPG}(t) \geq b\} \geq \beta] \quad (7)$$

where $p_{min,k}^{VPG}(t)$ denotes the lower limit (MW) of the available power of the WVPG at moment t; and $p_{min,k}^{VPG}(t)$ means that it is assured with a probability higher than $\beta$ that the available power of the WVPG at moment t is greater than or equal to b, and a maximum value of b is the lower limit of the available power;

limit indexes of the available power are calculated as follows:

separately setting $\tilde{p}_{a|t,i}, \tilde{P}_{a|t,i}$ as an ith state value and state probability of multi-state probability distribution $\tilde{f}_{t,i}^{VPG}$, where using the upper limit of the available power as an example, if a cumulative probability corresponding to a bth state value of $\tilde{f}_{t,i}^{VPG}$ satisfies formula (8):

$$\sum_{i=1}^{b} \tilde{P}_{a|t,i} \leq \beta < \sum_{i=1}^{b+1} \tilde{P}_{a|t,i} \quad (8)$$

the upper limit of the available power is defined as formula (9):

$$p_{max}^{VPG}(t) = \tilde{p}_{a|t,p} + (\tilde{p}_{a|t,b+1} - \tilde{p}_{a|t,p})\frac{\left(\beta - \sum_{i=1}^{b}\tilde{P}_{a|t,i}\right)}{\tilde{P}_{a|t,b+1}} \quad (9)$$

where $\tilde{p}_{a|t,b+1} - \tilde{p}_{a|t,b}$ denotes a difference between values of a (b+1)th state and the bth state, and $$\left(\beta - \sum_{i=1}^{b}\tilde{P}_{a|t,i}\right)/\tilde{P}_{a|t,b+1}$$

denotes a ratio of a difference between the confidence probability β and a cumulative probability of the bth state to a difference between a cumulative probability of the (b+1)th state and that of the bth state;

b3: calculating an output adjustment range, where the output adjustment range includes output up/down-adjustment limits of the WVPG at moment t; an output adjustment range of the thermal power unit is determined by the upper and lower limits of the available power; an output adjustment range of the WVPG is determined by both the upper and lower limits of the available power and a control method;

an output up-adjustment limit $p_{t,max}^{VPG}(t)$ (MW) of the WVPG at moment t is equal to the upper limit $p_{max}^{VPG}(t)$ of the available power; the output down-adjustment limit is determined in the following two cases: when generator tripping is allowed, the output of the WVPG can be adjusted down to 0, and in this case, $p_{r,min}^{VPG}(t)=0$; when only pitch angle adjustment is allowed, a power down-adjustment limit (MW) of the wind power unit is set to be k % of the available power, and in this case, the output down-adjustment limit may be expressed as:

$$p_{r,min}^{VPG}(t)=k\% \ E(P_a^{VPG}(t)) \quad (10);$$

b4: calculating a ramp rate, where a ramp rate of the thermal power unit is a fixed value, whereas a ramp rate of the WVPG is determined by output fluctuation of the WVPG and is an upper/lower boundary value of fluctuation probability distribution $\tilde{f}_{t,i}^{VPG}$ Allt with a certain confidence probability; in addition, when determining a ramp rate limit of the WVPG in a dispatch model, it is further necessary to consider a restriction imposed by a dispatch procedure on a wind power fluctuation range allowed per unit time;

first, a ramp-up rate limit $r_{u1}^{VPG}(t)$ (MW/min) of the WVPG determined by output fluctuation at moment t is defined as shown in formula (11):

$$r_{u1}^{VPG}(t)=\min[a:P\{\Delta P^{VPG}(t) \leq a\} \geq \beta] \quad (11)$$

where $\Delta P^{VPG}(t)$ denotes a random variable of output fluctuation of the WVPG at moment t; β denotes the confidence probability; $r_{u1}^{VPG}(t)$ denotes the ramp-up rate limit of the WVPG determined by fluctuation at moment t, and is a positive value; formula (11) means that it is assured with a probability higher than β that a fluctuation value is less than or equal to a, and a minimum value of a is the ramp-up rate limit determined by fluctuation;

a ramp-down rate limit $r_{d1}^{VPG}(t)$ (MW/min) of the WVPG determined by output fluctuation at moment t is defined as formula (12):

$$r_{d1}^{VPG}(t)=\max[b:P\{\Delta P^{VPG}(t) \geq b\} \geq \beta] \quad (12)$$

where $r_{d1}^{VPG}(t)$ denotes the ramp-down rate limit of the WVPG determined by output fluctuation at moment t, and is a negative value; formula (12) means that it is assured with a probability higher than β that a fluctuation value is greater than or equal to b, and a maximum value of b is the ramp-down rate limit determined by fluctuation;

considering both the ramp rate limits determined by output fluctuation and the restriction imposed by the dispatch procedure on the wind power fluctuation range allowed per unit time, the ramp-up and ramp-down rate limits of the WVPG in the dispatch model may be determined respectively by using formula (13) and formula (14);

the ramp-up rate limit of the WVPG is calculated as follows:

$$r_u^{VPG}(t)=\min[r_{u1}^{VPG}(t), r_{u2}^{VPG}(t)] \quad (13)$$

where $r_{u2}^{VPG}(t)$ denotes the ramp-up rate limit (MW/min) of the WVPG determined by the dispatch procedure at moment t, and $r_u^{VPG}(t)$ denotes the ramp-up rate limit (MW/min) of the WVPG at moment t;

when $r_{u1}^{VPG}(t) < r_{u2}^{VPG}(t)$, indicates that the ramp-up rate limit determined by fluctuation is lower than the restriction imposed by the dispatch procedure from moment t−1 to moment t; the ramp-up rate limit needs to be set to $r_u^{VPG}(t)=r_{u1}^{VPG}(t)$ to avoid overestimating a power rise rate;

when $r_{u1}^{VPG}(t) > r_{u2}^{VPG}(t)$, it indicates that the ramp-up rate limit determined by fluctuation is higher than the restriction imposed by the dispatch procedure from moment t−1 to moment t; the ramp-up rate limit needs to be set to $r_u^{VPG}(t)=r_{u2}^{VPG}(t)$ to prevent power from rising too fast;

the ramp-down rate limit of the WVPG is calculated as follows:

$$r_d^{VPG}(t)=\min[r_{d1}^{VPG}(t), r_{d2}^{VPG}(t)] \quad (14)$$

where $r_{d2}^{VPG}(t)$ denotes the ramp-down rate limit (MW/min) of the WVPG determined by the dispatch procedure at moment t, and is a negative value; $r_d^{VPG}(t)$ denotes the ramp-down rate limit (MW/min) of the WVPG at moment t, and is a negative value;

if $r_{d1}^{VPG}(t) < r_{d2}^{VPG}(t)$, indicates that output determined by fluctuation drops too fast from moment t−1 to moment t, and the ramp-down rate limit needs to be set to $r_d^{VPG}(t)=r_{d1}^{VPG}(t)$ to avoid underestimating the ramp-down rate;

if $r_{d1}^{VPG}(t) > r_{d2}^{VPG}(t)$, it indicates that a downward fluctuation rate of output is less than a requirement of the dispatch procedure from moment t−1 to moment t; the ramp-down rate may be increased through a control method such as wind curtailment if necessary, and the ramp-down rate limit is set to $r_d^{VPG}(t) = r_{d1}^{VPG}(t)$; and a ramp rate index is calculated as follows:

conducting quantile operation on the multi-state probability distribution $\tilde{f}_{s_{ii}}^{V^{pti}}$ of fluctuation of the WVPG at moment t to obtain the ramp-up and ramp-down rate limits $r_{u1}^{VPG}(t)$, $r_{d1}^{VPG}(t)$ determined by output fluctuation; and then obtaining values of the ramp rate limits of the WVPG at the current moment by using formula (13) and formula (14).

In a preferred technical solution of the present disclosure, the analysis method in step S3 includes:

c1. variables c1.1. integer variables 1) v(i,t): a variable that denotes an on/off state of unit i at moment t, where v(i,t)=1 indicates that unit i is on at moment t, and v(i,t)=0 indicates that unit i is off at moment t;

2) y(i,t): a variable that denotes a conversion state of unit i at moment t, where y(i,t)=1 indicates that unit i changes from the off state to the on state at moment t, and y(i,t)=0 indicates that the unit is in another state;

3) z(i,t): a variable that denotes the conversion state of unit i at moment t, where z(i,t)=1 indicates that unit i changes from the on state to the off state at moment t, and z(i,t)=0 indicates that the unit is in another state;

4) ω(i,t,j): a variable that denotes a downtime state of the unit, where ω(i,j)=1 indicates that unit i has been off for j hours at moment t, and ω(i,t,j)=0 indicates that the unit is in another state; and Tr(i,t): a variable valued 0 or 1 added to denote the startup time of a translatable load, where Tr(i,t)=1 indicates that translatable load i starts to operate at moment t, and Tr(i,t)=0 indicates that translatable load i does not start to operate at moment t;

c1.2. continuous variable p(i,t): output of unit i at moment t;

c2. objective function $$\underset{p(i,t),v(i,t)}{Min} \sum_{t=1}^{TT} \sum_{i=1}^{NG} [c(i,t) + b(i,t)] \quad (15)$$

$$\text{where } c(i,t) = A(i) \times p(i,t)^2 + B(i) \times p(i,t) + C(i) \times v(i,t) \quad (16)$$

where TT denotes total operation duration; NG denotes the number of units; A(i), B(i), C(i) respectively denote a quadratic coefficient, a linear coefficient, and a constant term in a quadratic function of power generation costs and output power of unit i; c(i,t) denotes power generation costs of unit i at moment t; b(i,t) denotes startup costs of unit i at moment t; calculation of b(i,t) is related to downtime of the unit before startup, and detailed calculation is described in constraints; shutdown costs is usually not considered because it has little impact on total costs;

c3. constraints:

c3.1. power balance constraint $$\sum_{i}^{NG} p(i,t) = D_0(t) + \sum_{i=1}^{NI} PD(i,t) \quad \forall t \in T \quad (17)$$

where PD(i,t) denotes a load value of translatable load i at moment t; $D_0(t)$ denotes a fixed system load at moment t; NI denotes the number of translatable loads; the sum of the fixed loads and the translatable load after translation matches the total output of the unit based on this constraint;

c3.2. constraint on upper and lower output limits of the unit $$\underline{p}(i,t) \times v(i,t) \leq p(i,t) \leq \overline{p}(i,t) \times v(i,t) \forall i \in G, t \in T \quad (18)$$

where $\underline{p}(i,t)$ denotes the lower output limit of unit i at moment t; $\overline{p}(i,t)$ denotes the upper output limit of unit i at moment t; G denotes a set of units; this constraint ensures that the units can operate in an output range for normal operation;

c3.3. constraints on startup/shutdown auxiliary variable $$y(i,t) + z(i,t) \leq 1 \quad \forall i \in G, t \in T \quad (19)$$

$$y(i,t) - z(i,t) = v(i,t) - v(i,t-1) \forall i \in G, t \in T \quad (20)$$

where formula (19) imposes a restriction that prevents a unit from being started and shut down at the same time, and formula (20) restricts consistency between startup and shutdown actions and an operating state of the unit;

c3.4. constraints on minimum runtime $$\sum_{k=1}^{G(i)} [1 - v(i,k)] = 0 \quad (21)$$

$$\sum_{k=t}^{t+T_{up}(i)-1} v(i,k) \geq T_{up}(i) \times y(i,t) \quad \forall t = G(i) + 1L\ TT - T_{up}(i) + 1 \quad (22)$$

$$\sum_{k=t}^{TT} [v(i,k) - y(i,t)] \geq 0 \quad \forall t = TT - T_{up}(i) + 2L\ TT \quad (23)$$

where G(i)=Min[TT,($T_{up}(i) - T_0(i)$)×$U_0(i)$] denotes minimum runtime initially required by unit i after operation starts; $T_{up}(i)$ denotes minimum startup runtime of unit i; $U^0(i)$ denotes an initial operating state of unit I, and if $U_0(i)=1$, unit i is initially in operation, and if $U_0(i)$ 0, unit i is initially in shutdown state; $T_0(i)$ denotes initial runtime or downtime of unit i, and is a positive number when it denotes the initial runtime and a negative number when it denotes the initial downtime; impact of an operating state at the end of a previous day on start of operation on a new day is mainly considered in formulas (22) and (23); if the unit is initially in operation, formula (22) indicates that the unit requires at least a runtime constraint; formula (23) denotes a minimum runtime constraint in last $T_{up}(i)$−1 hours of runtime; if the unit starts in this time period, it needs to operate until the end of the day and cannot be shut down again;

c3.5. constraints on minimum downtime $$\sum_{k=1}^{L(i)} v(i,k) = 0 \quad (24)$$

$$\sum_{k=t}^{t+T_{down}(i)-1} [1 - v(i,k)] \geq T_{down}(i) \times z(i,t) \quad \forall t = \quad (25)$$

$$L(i) + 1 \ldots TT - T_{down}(i) + 1$$

-continued $$\sum_{k=t}^{TT} [1 - v(i, k) - z(i, t)] \geq 0 \quad \forall\, t = TT - T_{down}(i) + 2 \ldots TT \quad (26)$$

where $L(i)=\mathrm{Min}[TT,(T_{down}(i)+T_0(i))\times(1-U_0(i))]$, it denotes minimum downtime initially required by unit i after operation starts; $T_{down}(i)$ denotes minimum downtime of unit i; impact of an operating state at the end of a previous day on start of operation on a new day is mainly considered in formulas (25) and (26); if the unit is initially in shutdown state, it indicates that the unit requires at least a downtime constraint; formula (25) denotes a minimum downtime constraint each time unit i is shut down; formula (26) denotes a minimum downtime constraint in last $T_{down}(i)-1$ hours of runtime; if the unit is shut down in the time period, it needs to be in shutdown state until the end of the day and cannot be started again;

c3.6. ramp rate constraints $$p(i,t)-p(i,t-1) \leq \mathrm{RATEUP}(i) \forall i \in G, t=2,3 \ldots TT \quad (27)$$

$$p(i,t-1)-p(i,t) \leq \mathrm{RATEDN}(i) \forall i \in G, t=2,3 \ldots TT \quad (28)$$

where RATEUP(i) denotes a ramp-up rate of unit i, that is, a rate at which output of unit i increases; RATEDN(i) denotes a ramp-down rate of unit i, that is, a rate at which output of unit i decreases; an output change between two adjacent time periods is limited because the output of the unit is adjusted at a limited rate; and the ramp rate constraint represents this limitation;

c3.7. downtime counter constraints $$S(i,t) \leq S(i,t-1)+1 \forall t \in T$$

$$S(i,t)+(IT+1)\times v(i,t) \geq S(i,t-1)+1 \forall t \in T$$

$$S(i,t)-TT\times[1-v(i,t)] \leq 0 \forall t \in T$$

$$S(i,t) \geq 0 \forall t \in T \quad (29)$$

where S(i,t) is a downtime count variable that denotes accumulated consecutive downtime of unit i at moment t; it is necessary to use the constraint to record downtime because startup costs in the model are segmented and related to the downtime of the unit; a function implemented by the four constraints is as follows: when v(i,t)=0, S(i,t)=S(i,t-1)+1, and when v(i,t)=1, S(i,t)=0, thereby implementing accumulation of consecutive downtime;

c3.8. constraints on segmented startup costs $$b(i, t) = \sum_{j=1}^{ND} \mathrm{UP\ cost}\,(i, j) \times \omega(i, t, j) \quad \forall\, t \in T \quad (30)$$

$$\sum_{j=1}^{ND} \omega(i, t, j) = y(i, t) \quad \forall\, t \in T$$

$$S(i, t-1) = \sum_{j=1}^{ND-1} j \times \omega(i, t, j) + m(i, t), \quad \forall\, t \in T$$

$$m(i, t) \leq TT \times [\omega(i, t, ND) - y(i, t) + 1] \quad \forall\, t \in T$$

$$m(i, t) \geq ND \times \omega(i, t, ND) \quad \forall\, t \in T$$

where in these constraints, segmented startup costs b(i,t) are calculated by using a counter of consecutive downtime; UP cos t(i,j) denotes startup costs after unit i is shut down for j hours; longer downtime usually indicates higher startup costs, and the startup costs no longer change after the unit is shut down for a certain time period; ND denotes a time threshold that finally allows the startup costs to stop changing in segmented startup costs calculation; $\omega(i,t,j)$ is a variable valued 0 or 1 that denotes a downtime state of the unit, where $\omega(i,t,j)=1$ indicates that unit i has been shut down for j hours at moment t, and $\omega(i,t,j)=0$ indicates that the unit is in another state; in this constraint, for each time period of each unit, at most one $\omega(i,t,j)$ can be set to 1; in formula (30), dummy variable m(i,t) is used to associate consecutive downtime count S(i,t) with $\omega(i,t,j)$;

c3.9. constraint on period-based load translation $$PD(i, t) = \sum_{j=1}^{T_0} [Tr(i, t-j+1) \times D_{tr}(i, j)] \quad \forall\, i \in NI, t \in NT(i) \quad (31)$$

$$\sum_{t=1}^{TT} Tr(i, t) = 1, \forall\, i \in NI$$

$$\sum_{t=TT-NT(i)+1}^{TT} Tr(i, t) = 0, \forall\, i \in NI$$

where $T_0=\min[t,NT(i)]$; $D_{tr}(i,j)$ denotes a load value of a jth segment in a load sequence of translatable load i; NT(i) denotes a time length of the sequence of translatable load i; and NI denotes a set of sequence numbers of translatable loads.

In a preferred technical solution of the present disclosure, the distribution method in step S4 includes:
- d1: establishing a general model of an optimal power distribution problem;
- d2: simplifying the general model of the optimal power distribution problem;
- d3: solving the simplified model of the optimal power distribution problem; and
- d4: conducting simulation analysis on a solved value.

Compared with the prior art, the present disclosure has the following beneficial effects:

The present disclosure discloses a peak shaving control method for emergent source-grid coordination in case of a faulty sending-end power grid. In the present disclosure, real-time dispatchability of wind power participating in real-time power balance is first analyzed, specific evaluation indexes and calculation methods are provided, and calculation examples are given for verification. Then, an optimized real-time dispatch strategy is provided based on demand-side response resources, and DC and AC lines are coordinated for operation in terms of tie-lines. The peak shaving control method for emergent source-grid coordination when a sending-end power grid is faulty is provided to ensure normal operation.

BRIEF DESCRIPTION OF THE DRAWINGS

FIG. 1 is a schematic flowchart of a method for controlling peak saving by wind power grid according to an embodiment of the present disclosure.

DETAILED DESCRIPTION

The following clearly and completely describes the technical solutions in the embodiments of the present disclosure with reference to the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

As shown in FIG. 1, the present disclosure provides a peak shaving control method for emergent source-grid coordination in case of a faulty sending-end power grid. The method includes the following steps:

S1: Evaluate dispatchability of a cluster virtual wind power unit.
S2: Develop a method for calculating a dispatchability index of the cluster virtual wind power unit.
S3: Analyze a source-load peak-shaving resource strategy.
S4: Distribute a control strategy for tie-line peak shaving.

The evaluation method in step S1 includes the following steps:

a1: Conduct statistical analysis on probability distributions of wind power characteristics and a time-varying characteristic of a correlation coefficient. The wind power characteristics concerned include fluctuation and uncertainty. Fluctuation $\Delta P^{VPG}(t)$ and uncertainty $\varepsilon^{VPG}(t)$ of a wind cluster virtual power generation unit (WVPG) may be expressed as:

$$\Delta P^{VPG}(t) = \sum_{i=1}^{n_k} \Delta P_i^W(t) \text{ and} \quad (1)$$

$$\varepsilon^{VPG}(t) = \sum_{i=1}^{n_k} E_i^W(t). \quad (2)$$

In formulas (1) and (2), $n_k$ denotes the number of wind farms in the WVPG, t denotes time, $\Delta_i^W(t)$ denotes fluctuating power of an ith wind farm, and $\varepsilon_i^W(t)$ denotes uncertainty of the ith wind farm.

a2: Establish a model set based on a marginal probability distribution and an offline condition of a rank correlation coefficient matrix, including the following steps:

a2.1: Establish an offline model set of conditional probability distributions of fluctuation $\Delta P_i^W(t)$ and uncertainty $\varepsilon_i^W(t)$ of each wind farm in the WVPG.

a2.2: Establish an offline model set of conditional rank correlation coefficient matrixes $R_{\varepsilon}^{VPG}, R_{\Delta P}^{VPG}$ of a cumulative probability distribution function of fluctuation $\Delta P_i^W(t)$ and uncertainty $\varepsilon_i^W(t)$ among a plurality of wind farms in the WVPG.

a2.3: Establish in a rolling manner, by using a Monte Carlo simulation method based on a genetic algorithm, conditional probability distributions of the WVPG and each wind farm in the WVPG at each moment under a joint constraint of a marginal conditional probability distribution of each wind farm and conditional rank correlation coefficient matrixes of the plurality of wind farms.

a3: Conduct online sampling and calculation based on a time-varying probability distribution of the WVPG, including the following steps:

a3.1: Conduct initialization, and randomly generate S $n_s \times n_k$-order matrixes as an initial population of the genetic algorithm, where $n_s$ denotes a sampling scale, $n_k$ denotes the number of wind farms in the WVPG, and matrix elements are random numbers evenly distributed within [0,1].

a3.2: Select a rank correlation coefficient matrix from the offline model set. First predict a wind direction based on wind farms i and j at moment t. Calculate a wind direction difference coefficient. Set $(\bar{F}_{\varepsilon,i,m}, \bar{F}_{\varepsilon,j,m})$ as a data pair including elements in ith and jth columns in an mth random matrix, where $m \in (1, 2, \ldots, S)$. Group data pairs in $(\bar{F}_{\varepsilon,i,m}, \bar{F}_{\varepsilon,j,m})$ into several subsets. Set $\tilde{R}_{\varepsilon,ij,c}$ as a rank correlation coefficient calculated based on elements in a cth subset of wind farms i and j in the mth random matrix. Set $\tilde{R}_{\varepsilon,ij,c}$ as a rank correlation coefficient with the same value as condition set $\tilde{R}_{\varepsilon,ij,c}$ in the offline model set. An objective function of an mth matrix $A_m$ may be set as:

$$G(A_m) = \sum_{i=1}^{n_k} \sum_{j=1 \& i \neq j}^{n_k} \sum_{c=1}^{n_C} (\tilde{R}_{\varepsilon,ij,c} - R_{\varepsilon,ij,c})^2. \quad (3)$$

In formula (3), $n_c$ denotes the number of subsets.

a3.3: Solve formula (3) by using the genetic algorithm. Elements in the S random matrixes are changed through genetic and mutation operations to allow a rank correlation coefficient matrix of an optimal matrix (which allows $G(A_m)$ to be minimized in each iteration) to approximate to target value $\tilde{R}_{\varepsilon,ij,c}$, that is, to minimize in formula (3).

a3.4: Conduct convergence judgment. Set $A_k^*$ as an optimal matrix of a kth generation of the genetic algorithm and $A_0^*$ as an initial optimal matrix. In this case, an improvement of the optimal matrix of the kth generation relative to an initial condition is $G(A_k^*) - G(A_0^*)$. In the kth generation, if $|G(A_k^*) - G(A_{k-1}^*)| \leq \sigma |G(A_k^*) - G(A_0^*)|$, genetic algorithm iteration stops, where $\sigma$ denotes a convergence coefficient of the algorithm; otherwise, the process goes back to a3.2.

a3.5: Select cumulative distribution function $F_{\varepsilon,i}(t)$ corresponding to wind farm i from the offline model set based on a value of an uncertainty condition set of wind farm i at moment t. Set $a_{i,g}^* g = 1, 2, \ldots, n_s$ as a gth element in an ith column of the optimal matrix in a3.4. In this case, a gth sample of wind farm i is $\tilde{e}_{i,g}^W = F_{\varepsilon,i}(a_{i,g}^*)$, and a gth sample of the WVPG is $$\tilde{e}_g^{VPG}(t) = \sum_{i=1}^{n_k} \tilde{e}_{i,g}^W(t).$$

a3.6: Check sample time correlation.

a3.7: Collect statistics about frequency distributions of uncertainty of each wind farm and the WVPG at moment t based on samples, which is an estimate of a discrete probability distribution when the sampling scale $n_s$ is large enough. In this way, discrete estimates $\tilde{f}_{\varepsilon,i}^W$ and $\tilde{f}_{\varepsilon,i}^{VPG}$ of time-varying probability distributions of uncertainty of wind farm i and the WVPG at moment t can be obtained.

The calculation method in step S2 includes the following steps:

b1: Calculate available power. The available power is a possible value of actual output of the WVPG at moment t. Available power of a thermal power unit is any point value between minimum stable combustion output and installed capacity, and a range of the available power remains unchanged at different moments when the thermal power unit operates online. Available power of the WVPG complies with a probability distribution, and a probability distribution of the available power at different moments varies with a predicted power value and an uncertainty probability distribution.

The available power of the WVPG at moment t is defined as formula (4):

$$P_a^{VPG}(t) = p_f^{VPG}(t) + \varepsilon^{VPG}(t) \qquad (4).$$

In formula (4), $P_a^{VPG}(t)$ denotes the available power (in the unit of MW) of the WVPG at moment t and is a random variable, and a corresponding time-varying probability distribution is $\tilde{f}_{\varepsilon,t}^{VPG}$; $p_f^{VPG}(t)$ denotes a predicted power value (MW) of the WVPG at moment t; $\varepsilon^{VPG}(t)$ denotes a random variable (MW) of output uncertainty of the WVPG at moment t, and a corresponding time-varying probability distribution is $\tilde{f}_{\varepsilon,t}^{VPG}$.

The probability distribution of the available power is calculated as follows:

(1) Conduct a translation operation on a multi-state probability distribution $\tilde{f}_{\varepsilon,t}^{VPG}$ of uncertainty of the WVPG at moment t, where a translation length is a predicted value $p_f^{VPG}(t)$; respectively set $\tilde{\varepsilon}_i, \tilde{\varepsilon}'_i$ as values of an ith state of $\tilde{f}_{\varepsilon,t}^{VPG}$ before and after the translation, and $\tilde{P}_{\varepsilon,i}$, $\tilde{P}'_{\varepsilon,i}$ as corresponding state probabilities. In this case, $$G(A_m) = \sum_{i=1}^{n_k} \sum_{j=1 \& i \neq j}^{n_k} \sum_{c=1}^{n_C} (\tilde{\mathcal{R}}_{\varepsilon,ij,c} - \mathcal{R}_{\varepsilon,ij,c})^2. \qquad (3)$$

(2) Conduct downward truncation on the probability distribution after the translation from a point valued 0 based on a fact that the minimum available power of the WVPG is 0. If values of state 1 to state a of the probability distribution after the translation is less than 0, probability $\tilde{P}''_{\varepsilon 0}$ corresponding to state 0 after the downward truncation is:

$$\tilde{P}''_{\varepsilon 0} = \tilde{P}'_{\varepsilon 0} + \sum_{i=1}^{a} \tilde{P}'_{\varepsilon,i} \qquad (5)$$

In formula (5), $\tilde{P}'_{\varepsilon 0}$ denotes a probability of a multi-state distribution valued 0 before the truncation operation is performed at the point valued 0. If the distribution has no state valued 0 before the truncation, $\tilde{P}_{\varepsilon 0}' = 0$.

b2: Calculate available power limits. The available power limits are the maximum and minimum available power of the WVPG at moment t. An upper limit of output of the thermal power unit is the installed capacity, and a lower limit of the output is the minimum stable combustion output. The lower and upper limits are fixed values at all moments. The available power limits of the WVPG are upper and lower boundary values of the probability distribution at a certain confidence level, and vary with the probability distribution of the available power.

The upper limit of the available power of the WVPG at moment t is defined as formula (6) based on the value-at-risk theory:

$$p_{max}^{VPG}(t) = \min[a : P\{P_a^{VPG}(t) \leq a\} \geq \beta] \qquad (6).$$

In formula (6), $p_{max}^{VPG}(t)$ denotes the upper limit (MW) of the available power of the WVPG at moment t, and $\beta$ denotes a confidence probability. $p_{max}^{VPG}(t)$ means that it is assured with a probability higher than $\beta$ that the available power of the WVPG at moment t is less than or equal to a, and a minimum value of a is the upper limit of output.

The lower limit of the available power of the WVPG at moment t is defined as formula (7):

$$p_{min,k}^{VPG}(t) = \max[b : P\{p_{b,k}^{VPG}(t) \geq b\} \geq \beta] \qquad (7).$$

In formula (7), $p_{min,k}^{VPG}(t)$ denotes the lower limit (MW) of the available power of the WVPG at moment t. $p_{min,k}^{VPG}(t)$ means that it is assured with a probability higher than $\beta$ that the available power of the WVPG at moment t is greater than or equal to b, and a maximum value of b is the lower limit of the available power.

Limit indexes of the available power are calculated as follows:

Separately set $\tilde{p}_{a|t,i}, \tilde{P}_{a|t,i}$ as an ith state value and state probability of multi-state probability distribution $\tilde{f}_{\varepsilon,t}^{VPG}$. Using the upper limit of the available power as an example, if a cumulative probability corresponding to a bth state value of $\tilde{f}_{a|t}^{VPG}$ satisfies formula (8):

$$\sum_{i=1}^{b} \tilde{P}_{a|t,i} \leq \beta < \sum_{i=1}^{b+1} \tilde{P}_{a|t,i}, \qquad (8)$$

the upper limit of the available power is defined as formula (9):

$$p_{max}^{VPG}(t) = \tilde{p}_{a|t,b} + (\tilde{p}_{a|t,b+1} - \tilde{p}_{a|t,b}) \frac{\left(\beta - \sum_{i=1}^{b} \tilde{P}_{a|t,i}\right)}{\tilde{P}_{a|t,b+1}}. \qquad (9)$$

In formula (9), $\tilde{p}_{a|t,b+1} - \tilde{p}_{a|t,b}$ denotes a difference between values of a (b+1)th state and the bth state, and $$\left(\beta - \sum_{i=1}^{b} \tilde{P}_{a|t,i}\right) / \tilde{P}_{a|t,b+1}$$

denotes a ratio of a difference between the confidence probability $\beta$ and a cumulative probability of the bth state to a difference between a cumulative probability of the (b+1)th state and that of the bth state.

b3: Calculate an output adjustment range, where the output adjustment range includes output up/down-adjustment limits of the WVPG at moment t. An output adjustment range of the thermal power unit is determined by the upper and lower limits of the available power. An output adjustment range of the WVPG is determined by both the upper and lower limits of the available power and a control method.

An output up-adjustment limit $p_{r,max}^{VPG}(t)$ of the WVPG at moment t is equal to the upper limit $p_{max}^{VPG}(t)$ of the available power. The output down-adjustment limit is determined in the following two cases: When generator tripping is allowed, the output of the WVPG can be adjusted down to 0. In this case, $p_{r,min}^{VPG}(t)=0$. When only pitch angle adjustment is allowed, a power down-adjustment limit (MW) of the wind power unit is set to be k % of the available power. In this case, the output down-adjustment limit may be expressed as:

$$p_{r,min}^{VPG}(t)=k\% \ E(P_a^{VPG}(t)) \quad (10).$$

b4: Calculate a ramp rate. A ramp rate of the thermal power unit is a fixed value, whereas a ramp rate of the WVPG is determined by output fluctuation of the WVPG and is an upper/lower boundary value of fluctuation probability distribution $\tilde{f}_{\varepsilon,t}^{\text{VPG}}$ with a certain confidence probability. In addition, when determining a ramp rate limit of the WVPG in a dispatch model, it is further necessary to consider a restriction imposed by a dispatch procedure on a wind power fluctuation range allowed per unit time.

First, a ramp-up rate limit $r_{u1}^{VPG}(t)$ (MW/min) of the WVPG determined by output fluctuation at moment t is defined as shown in formula (11):

$$r_{u1}^{VPG}(t)=\min[a:P\{\Delta P^{VPG}(t)\leq a\}\geq \beta] \quad (11).$$

In formula (11), $\Delta P^{VPG}(t)$ denotes a random variable of output fluctuation of the WVPG at moment t; β denotes the confidence probability; $r_{u1}^{VPG}(t)$ denotes the ramp-up rate limit of the WVPG determined by fluctuation at moment t, and is a positive value. Formula (11) means that it is assured with a probability higher than β that a fluctuation value is less than or equal to a, and a minimum value of a is the ramp-up rate limit determined by fluctuation.

A ramp-down rate limit rdlPG (t) (MW/min) of the WVPG determined by output fluctuation at moment t is defined as formula (12):

$$r_{d1}^{VPG}(t)=\max[b:P\{\Delta P^{VPG}(t)\geq b\}\geq \beta] \quad (12).$$

In formula (12), $r_{d1}^{VPG}(t)$ denotes the ramp-down rate limit of the WVPG determined by output fluctuation at moment t, and is a negative value. Formula (12) means that it is assured with a probability higher than β that a fluctuation value is greater than or equal to b, and a maximum value of b is the ramp-down rate limit determined by fluctuation.

Considering both the ramp rate limits determined by output fluctuation and the restriction imposed by the dispatch procedure on the wind power fluctuation range allowed per unit time, the ramp-up and ramp-down rate limits of the WVPG in the dispatch model may be determined respectively by using formula (13) and formula (14).

The ramp-up rate limit of the WVPG is calculated as follows:

$$r_u^{VPG}(t)=\min[r_{u1}^{VPG}(t),r_{u2}^{VPG}(t)] \quad (13).$$

In formula (13), $r_{u2}^{VPG}(t)$ denotes the ramp-up rate limit (MW/min) of the WVPG determined by the dispatch procedure at moment t, and $r_u^{VPG}(t)$ denotes the ramp-up rate limit (MW/min) of the WVPG at moment t.

When $r_{u1}^{VPG}(t)<r_{u2}^{VPG}(t)$, indicates that the ramp-up rate limit determined by fluctuation is lower than the restriction imposed by the dispatch procedure from moment t−1 to moment t. The ramp-up rate limit needs to be set to $r_u^{VPG}(t)=r_{u1}^{VPG}(t)$ to avoid overestimating a power rise rate.

When $r_{u1}^{VPG}(t)>r_{u2}^{VPG}(t)$, it indicates that the ramp-up rate limit determined by fluctuation is higher than the restriction imposed by the dispatch procedure from moment t−1 to moment t. The ramp-up rate limit needs to be set to $r_u^{VPG}(t)=r_{u2}^{VPG}(t)$ to prevent power from rising too fast.

The ramp-down rate limit of the WVPG is calculated as follows:

$$r_d^{VPG}(t)=\min[r_{d1}^{VPG}(t),r_{d2}^{VPG}(t)] \quad (14).$$

In formula (14), $r_{d2}^{VPG}(t)$ denotes the ramp-down rate limit (MW/min) of the WVPG determined by the dispatch procedure at moment t, and is a negative value; $r_d^{VPG}(t)$ denotes the ramp-down rate limit (MW/min) of the WVPG at moment t, and is a negative value.

If $r_{d1}^{VPG}(t)<r_{d2}^{VPG}(t)$, indicates that output determined by fluctuation drops too fast from moment t−1 to moment t. The ramp-down rate limit needs to be set to $r_d^{VPG}(t)=r_{d1}^{VPG}(t)$ to avoid underestimating the ramp-down rate.

If $r_{d1}^{VPG}(t)>r_{d2}^{VPG}(t)$, itindicates that a downward fluctuation rate of output is less than a requirement of the dispatch procedure from moment t−1 to moment t. The ramp-down rate may be increased through a control method such as wind curtailment if necessary, and the ramp-down rate limit is set to $r_d^{VPG}(t)=r_{d2}^{VPG}(t)$.

A ramp rate index is calculated as follows:

Conduct quantile operation on the multi-state probability distribution $\tilde{f}_{\varepsilon,t}^{\text{VPG}}$ of fluctuation of the WVPG at moment t to obtain the ramp-up and ramp-down rate limits $r_{u1}^{VPG}(t)$, $r_{d1}^{VPG}(t)$ determined by output fluctuation. Then obtain values of the ramp rate limits of the WVPG at the current moment by using formula (13) and formula (14).

The analysis method in step S3 includes the following:
c1. variables
c1.1. integer variables
1) v(i,t): a variable that denotes an on/off state of unit i at moment t, where v(i,t)=1 indicates that unit i is on at moment t, and v(i,t)=0 indicates that unit i is off at moment t;
2) y(i,t): a variable that denotes a conversion state of unit i at moment t, where y(i,t)=1 indicates that unit i changes from the off state to the on state at moment t, and y(i,t)=0 indicates that the unit is in another state;
3) z(i,t): a variable that denotes the conversion state of unit i at moment t, where z(i,t)=1 indicates that unit i changes from the on state to the off state at moment t, and z(i,t)=0 indicates that the unit is in another state; and
4) ω(i,tj): a variable that denotes a downtime state of the unit, where ω(i,t,j)=1 indicates that unit i has been off for j hours at moment t, and ω(i,t,j)=0 indicates that the unit is in another state.

Tr (i,t), a variable valued 0 or 1, further needs to be added to denote the startup time of a translatable load. Tr (i,t)=1 indicates that translatable load i starts to operate at moment t. Tr (i,t)=0 indicates that translatable load i does not start to operate at moment t.
c1.2. continuous variable
p(i,t): output of unit i at moment t.
c2. objective function $$\min_{p(i,t),y(i,t)} \sum_{t=1}^{TT} \sum_{i=1}^{NG} [c(i,t)+b(i,t)], \quad (15)$$

$$\text{where } c(i,t)=A(i)\times p(i,t)^2+B(i)\times p(i,t)+C(i)\times v(i,t) \quad (16).$$

In the formulas, TT denotes total operation duration; NG denotes the number of units; A(i), B(i), C(i) respectively denote a quadratic coefficient, a linear coefficient, and a constant term in a quadratic function of power generation costs and output power of unit i; c(i,t) denotes power generation costs of unit i at moment t; b(i,t) denotes startup costs of unit i at moment t; calculation of b(i,t) is related to downtime of the unit before startup, and detailed calculation is described in constraints; shutdown costs is usually not considered because it has little impact on total costs.

c3. constraints c3.1. power balance constraint $$\sum_{i}^{NG} p(i,t) = D_0(t) + \sum_{i=1}^{NI} PD(i,t) \quad \forall t \in T. \tag{17}$$

In formula (17), PD(i,t) denotes a load value of translatable load i at moment t; $D_0(t)$ denotes a fixed system load at moment t; and NI denotes the number of translatable loads. The sum of the fixed loads and the translatable load after translation matches the total output of the unit based on this constraint.

c3.2. constraint on upper and lower output limits of the unit $$\underline{p}(i,t) \times v(i,t) \leq p(i,t) \leq \overline{p}(i,t) \times v(i,t) \forall i \in G, t \in T \tag{18}$$

$\underline{p}(i,t)$ denotes the lower output limit of unit i at moment t; $\overline{p}(i,t)$ denotes the upper output limit of unit i at moment t; G denotes a set of units. This constraint ensures that the units can operate in an output range for normal operation.

c3.3. constraints on startup/shutdown auxiliary variable $$y(i,t)+z(i,t) \leq 1 \forall i \in G, t \in T \tag{19}$$

$$y(i,t)-z(i,t)=v(i,t)-v(i,t-1) \forall i \in G, t \in T \tag{20}$$

Formula (19) imposes a restriction that prevents a unit from being started and shut down at the same time. Formula (20) restricts consistency between startup and shutdown actions and an operating state of the unit.

c3.4. constraints on minimum runtime $$\sum_{k=1}^{G(i)} [1 - v(i,k)] = 0, \tag{21}$$

$$\sum_{k=t}^{t+T_{up}(i)-1} v(i,k) \geq T_{up}(i) \times y(i,t) \quad \forall t = G(i)+1 \ldots TT-T_{up}(i)+1 \tag{22}$$

$$\sum_{k=t}^{TT} [v(i,k) - y(i,t)] \geq 0 \quad \forall t = TT-T_{up}(i)+2 \ldots TT. \tag{23}$$

In the formulas, $G(i)=\min[TT,(T_{up}(i)-T_0(i))\times U_0(i)]$ denotes minimum runtime initially required by unit i after operation starts; $T_{up}(i)$ denotes minimum startup runtime of unit i; $U_0(i)$ denotes an initial operating state of unit I, and if $U_0(i)=1$, unit i is initially in operation, and if $U_0(i)=0$, unit i is initially in shutdown state; $T^0(i)$ denotes initial runtime or downtime of unit i, and is a positive number when it denotes the initial runtime and a negative number when it denotes the initial downtime. Impact of an operating state at the end of a previous day on start of operation on a new day is mainly considered in formulas (22) and (23). If the unit is initially in operation, formula (22) indicates that the unit requires at least a runtime constraint. Formula (23) denotes a minimum runtime constraint in last $T_{up}(i)-1$ hours of runtime. If the unit starts in this time period, it needs to operate until the end of the day and cannot be shut down again.

c3.5. constraints on minimum downtime $$\sum_{k=1}^{L(i)} v(i,k) = 0, \tag{24}$$

$$\sum_{k=t}^{t+T_{down}(i)-1} [1 - v(i,k)] \geq T_{down}(i) \times z(i,t) \quad \forall t = L(i)+1 \ldots TT-T_{down}(i)+1 \tag{25}$$

$$\sum_{k=t}^{TT} [1 - v(i,k) - z(i,t)] \geq 0 \quad \forall t = TT-T_{down}(i)+2 \ldots TT. \tag{26}$$

In the formulas, $L(i)=\min[TT,(T_{down}(i)+T_0(i))\times(1-U_0(i))]$, and it denotes minimum downtime initially required by unit i after operation starts; $T_{down}(i)$ denotes minimum downtime of unit i. Impact of an operating state at the end of a previous day on start of operation on a new day is mainly considered in formulas (25) and (26). If the unit is initially in shutdown state, it indicates that the unit requires at least a downtime constraint. Formula (25) denotes a minimum downtime constraint each time unit i is shut down. Formula (26) denotes a minimum downtime constraint in last $T_{down}(i)-1$ hours of runtime. If the unit is shut down in the time period, it needs to be in shutdown state until the end of the day and cannot be started again.

c3.6. ramp rate constraints $$p(i,t)-p(i,t-1) \leq \text{RATEUP}(i) \forall i \in G, t=2,3 \ldots TT \tag{27}$$

$$p(i,t-1)-p(i,t) \leq \text{RATEDN}(i) \forall i \in G, t=2,3 \ldots TT \tag{28}$$

RATEUP(i) denotes a ramp-up rate of unit i, that is, a rate at which output of unit i increases. RATEDN(i) denotes a ramp-down rate of unit i, that is, a rate at which output of unit i decreases. An output change between two adjacent time periods is limited because the output of the unit is adjusted at a limited rate. The ramp rate constraint represents this limitation.

c3.7. downtime counter constraints $$S(i,t) \leq S(i,t-1)+1 \quad \forall t \in T$$

$$S(i,t)+(TT+1) \times v(i,t) \geq S(i,t-1)+1 \quad \forall t \in T$$

$$S(i,t)-TT \times [1-v(i,t)] \leq 0 \quad \forall t \in T$$

$$S(i,t) \geq 0 \quad \forall t \in T \tag{29}$$

S(i,t) is a downtime count variable that denotes accumulated consecutive downtime of unit i at moment t. It is necessary to use the constraint to record downtime because startup costs in the model are segmented and related to the downtime of the unit. A function implemented by the four constraints is as follows: when v(i,t)=0, S(i,t)=S(i, t-1)+1, and when v(i,t)=1 S(i,t)=0, thereby implementing accumulation of consecutive downtime.

c3.8. constraints on segmented startup costs $$b(i,t) = \sum_{j=1}^{ND} \text{UP cost}(i,j) \times \omega(i,t,j) \quad \forall t \in T \tag{30}$$

$$\sum_{j=1}^{ND} \omega(i,t,j) = y(i,t) \quad \forall t \in T$$

-continued $$S(i, t-1) = \sum_{j=1}^{ND-1} j \times \omega(i, t, j) + m(i, t) \quad \forall t \in T$$

$$m(i, t) \leq TT \times [\omega(i, t, ND) - y(i, t) + 1] \quad \forall t \in T$$

$$m(i, t) \geq ND \times \omega(i, t, ND) \quad \forall t \in T.$$

In these constraints, segmented startup costs b(i,t) are calculated by using a counter of consecutive downtime. UP cos t(i,j) denotes startup costs after unit i is shut down for j hours. Longer downtime usually indicates higher startup costs. The startup costs no longer change after the unit is shut down for a certain time period. ND denotes a time threshold that finally allows the startup costs to stop changing in segmented startup costs calculation. ω(i,t,j) is a variable valued 0 or 1 that denotes a downtime state of the unit. ω(i,t,j)=1 indicates that unit i has been shut down for j hours at moment t, and ω(i,t,j)=0 indicates that the unit is in another state. In this constraint, for each time period of each unit, at most one ω(i,t,j) can be set to 1. In formula (30), dummy variable m(i,t) is used to associate consecutive downtime count S(i,t) with ω(i,t,j)

c3.9. constraint on period-based load translation $$PD(i, t) = \sum_{j=1}^{T_0} [Tr(i, t-j+1) \times D_{tr}(i, j)] \forall i \in NI, t \in NT(i) \quad (31)$$

$$\sum_{t=1}^{TT} Tr(i, t) = 1, \forall i \in NI$$

$$\sum_{t=TT-NT(i)+1}^{TT} Tr(i, t) = 0, \forall i \in NI.$$

$T_0 = \min[t, NT(i)]$. $D_{tr}(i,j)$ denotes a load value of a jth segment in a load sequence of translatable load i. NT(i) denotes a time length of the sequence of translatable load i. NI denotes a set of sequence numbers of translatable loads.

The distribution method in step S4 includes the following steps:
d1: Establish a general model of an optimal power distribution problem.
d2: Simplify the general model of the optimal power distribution problem.
d3: Solve the simplified model of the optimal power distribution problem.
d4: Conduct simulation analysis on a solved value.

In specific implementation, in the peak shaving control method for emergent source-grid coordination in case of a faulty sending-end power grid provided in the present disclosure, the dispatchability of the cluster virtual wind power unit is evaluated first, and the method for calculating the dispatchability index of the cluster wind power unit is developed. Then the source-load peak-shaving resource strategy is analyzed. Finally, the control strategy for tie-line peak shaving is distributed. In the present disclosure, real-time dispatchability of wind power participating in real-time power balance is first analyzed, specific evaluation indexes and calculation methods are provided, and calculation examples are given for verification. Then, an optimized real-time dispatch strategy is provided based on demand-side response resources, and DC and AC lines are coordinated for operation in terms of tie-lines. The peak shaving control method for emergent source-grid coordination when a sending-end power grid is faulty is provided to ensure normal operation.

It should be understood that in the description of the present disclosure, the indicated orientation or position relationships are based on the embodiments. They are merely intended to facilitate or simplify description of the present disclosure, rather than to indicate or imply that the mentioned apparatus or component must have a specific orientation and must be constructed and operated in a specific orientation. Therefore, they should not be construed as a limitation to the present disclosure.

In the present disclosure, unless otherwise clearly specified, for example, a connection may be a fixed connection, a removable connection, or an integral connection; may be a mechanical connection or an electrical connection; may be a direct connection or an indirect connection by using an intermediate medium; or may be intercommunication between two components or interaction between two components. Unless otherwise clearly specified, a person of ordinary skill in the art can understand a specific meaning of the term in the present disclosure based on a specific situation.

Although the embodiments of the present disclosure have been illustrated and described, it should be understood that a person of ordinary skill in the art may make various changes, modifications, replacements and variations to the above embodiments without departing from the principle and spirit of the present disclosure, and the scope of the present disclosure is limited by the appended claims and their legal equivalents.

The invention claimed is:

1. A method for controlling peak saving by wind power grid, comprising the following steps:
    S1: evaluating dispatchability of a cluster virtual wind power unit;
    S2: developing a method for calculating a dispatchability index of the cluster virtual wind power unit;
    S3: analyzing a source-load peak-shaving resource strategy, and controlling power output of a wind cluster virtual power generation unit (WVPG) to a power system based on the source-load peak-shaving resource strategy; and
    S4: distributing a control strategy for tie-line peak shaving to coordinate DC and AC lines for operation in terms of tie-lines;
    wherein the evaluation method in step S1 comprises:
    a1: conducting statistical analysis on probability distributions of wind power characteristics and a time-varying characteristic of a correlation coefficient, wherein the wind power characteristics concerned comprise fluctuation and uncertainty, and fluctuation $\Delta P^{VPG}(t)$ and uncertainty $\varepsilon^{VPG}(t)$ of the WVPG may be expressed as:

$$\Delta P^{VPG}(t) = \sum_{i=1}^{n_k} \Delta P_i^W(t) \quad (1)$$

$$\varepsilon^{VPG}(t) = \sum_{i=1}^{n_k} \varepsilon_i^W(t) \quad (2)$$

wherein $n_k$ denotes the number of wind farms in the WVPG, t denotes time, $\Delta P_i^W(t)$ denotes fluctuating power of an ith wind farm, and $\varepsilon_i^W(t)$ denotes uncertainty of the ith wind farm;

a2: establishing a model set based on a marginal probability distribution and an offline condition of a rank correlation coefficient matrix, comprising the following steps:
- a2.1: establishing an offline model set of conditional probability distributions of fluctuation $\Delta P_i^W(t)$ and uncertainty $\varepsilon_i^W(t)$ of each wind farm in the WVPG;
- a2.2: establishing an offline model set of conditional rank correlation coefficient matrixes $R_\varepsilon^{VPG}$, $R_{\Delta P}^{VPG}$ of a cumulative probability distribution function of fluctuation $\Delta P_i^W(t)$ and uncertainty $\varepsilon_i^W(t)$ among a plurality of wind farms in the WVPG; and
- a2.3: establishing in a rolling manner, by using a Monte Carlo simulation method based on a genetic algorithm, conditional probability distributions of the WVPG and each wind farm in the WVPG at each moment under a joint constraint of a marginal conditional probability distribution of each wind farm and conditional rank correlation coefficient matrixes of the plurality of wind farms; and a3: conducting online sampling and calculation based on a time-varying probability distribution of the WVPG, comprising the following steps:
- a3.1: conducting initialization, and randomly generating S $n_s \times n_k$-order matrixes as an initial population of the genetic algorithm, wherein $n_s$ denotes a sampling scale, $n_k$ denotes the number of wind farms in the WVPG, and matrix elements are random numbers evenly distributed within [0,1];
- a3.2: selecting a rank correlation coefficient matrix from the offline model set; first predicting a wind direction based on wind farms i and j at moment t, and calculating a wind direction difference coefficient setting $(\tilde{F}_{\varepsilon,i,m}, \tilde{F}_{\varepsilon,j,m})$ as a data pair comprising elements in ith and jth columns in an mth random matrix, wherein $m \in (1,2,\ldots,S)$; grouping data pairs in $(\tilde{F}_{\varepsilon,i,m}, \tilde{F}_{\varepsilon,j,m})$ into several subsets; setting $\tilde{R}_{\varepsilon,ij,c}$ as a rank correlation coefficient calculated based on elements in a cth subset of wind farms i and j in the mth random matrix; setting $R_{\varepsilon,ij,c}$ as a rank correlation coefficient with the same value as condition set $\tilde{R}_{\varepsilon,ij,c}$ in the offline model set, wherein an objective function of an mth matrix $A_m$ may be set as:

$$G(A_m) = \sum_{i=1}^{n_k} \sum_{j=1 \& i \neq j}^{n_k} \sum_{c=1}^{n_c} (\tilde{\mathcal{R}}_{\varepsilon,ij,c} - \mathcal{R}_{\varepsilon,ij,c})^2 \quad (3)$$

wherein $n_c$ denotes the number of subsets;
- a3.3: solving formula (3) by using the genetic algorithm, wherein elements in the S random matrixes are changed through genetic and mutation operations to allow a rank correlation coefficient matrix of an optimal matrix to approximate to target value $\tilde{R}_{\varepsilon,ij,c}$, that is, to minimize $G(A_m)$ in formula (3), wherein the optimal matrix allows $G(A_m)$ to be minimized in each iteration;
- a3.4: conducting convergence judgment; setting $A^*_k$ as an optimal matrix of a kth generation of the genetic algorithm and $A^*_0$ as an initial optimal matrix, wherein in this case, an improvement of the optimal matrix of the kth generation relative to an initial condition is $G(A^*_k)-G(A^*_0)$; in the kth generation, if $|G(A^*_k)-G(A^*_{k-1})| \leq \sigma |G(A^*_k)-G(A^*_0)|$, genetic algorithm iteration stops, wherein $\sigma$ denotes a convergence coefficient of the algorithm; otherwise, the process goes back to a3.2;
- a3.5: selecting cumulative distribution function $F_{\varepsilon,i}(t)$ corresponding to wind farm i from the offline model set based on a value of an uncertainty condition set of wind farm i at moment t; setting $a^*_{i,g}$ g=1, 2, ..., $n_s$ as a gth element in an ith column of the optimal matrix in a3.4, wherein in this case, a gth sample of wind farm i is $\tilde{\varepsilon}_{i,g}^W(t)=F_{\varepsilon,i}^{-1}(a^*_{i,g})$, and a gth sample of the WVPG is $$\tilde{\varepsilon}_g^{VPG}(t) = \sum_{i=1}^{n_k} \tilde{\varepsilon}_{i,g}^W(t);$$

- a3.6: checking sample time correlation; and
- a3.7: collecting statistics about frequency distributions of uncertainty of each wind farm and the WVPG at moment t based on samples, which is an estimate of a discrete probability distribution when the sampling scale $n_s$ is large enough, wherein in this way, discrete estimates $\tilde{f}_{\varepsilon|t,i}^W$ and $\tilde{f}_{\varepsilon|t}^{VPG}$ of time-varying probability distributions of uncertainty of wind farm i and the WVPG at moment t can be obtained;

wherein the calculation method in step S2 comprises:
b1: calculating available power, wherein the available power is a possible value of actual output of the WVPG at moment t; available power of a thermal power unit is any point value between minimum stable combustion output and installed capacity, and a range of the available power remains unchanged at different moments when the thermal power unit operates online; available power of the WVPG complies with a probability distribution, and a probability distribution of the available power at different moments varies with a predicted power value and an uncertainty probability distribution;
the available power of the WVPG at moment t is defined as formula (4):

$$P_a^{VPG}(t) = p_f^{VPG}(t) + \varepsilon^{VPG}(t) \quad (4)$$

wherein $P_a^{VPG}(t)$ denotes the available power (in the unit of MW) of the WVPG at moment t and is a random variable, and a corresponding time-varying probability distribution is $\tilde{f}_{a|t}^{VPG}$; $p_f^{VPG}(t)$ denotes a predicted power value (MW) of the WVPG at moment t; $\varepsilon^{VPG}(t)$ denotes a random variable (MW) of output uncertainty of the WVPG at moment t, and a corresponding time-varying probability distribution is $\tilde{f}_{\varepsilon|t}^{VPG}$;
the probability distribution of the available power is calculated as follows:
(1) conducting a translation operation on a multi-state probability distribution $\tilde{f}_{\varepsilon|t}^{VPG}$ of uncertainty of the WVPG at moment t, wherein a translation length is a predicted value $p_f^{VPG}(t)$; respectively setting $\tilde{\varepsilon}_i$, $\tilde{\varepsilon}'_i$ as values of an ith state of $\tilde{f}_{\varepsilon|t}^{VPG}$ before and after the translation, and $\tilde{P}_{\varepsilon,i}$, $\tilde{P}'_{\varepsilon,i}$ as corresponding state probabilities, wherein in this case, $$G(A_m) = \sum_{i=1}^{n_k} \sum_{j=1 \& i \neq j}^{n_k} \sum_{c=1}^{n_c} (\tilde{\mathcal{R}}_{\varepsilon,ij,c} - \mathcal{R}_{\varepsilon,ij,c})^2; \quad (3)$$

(2) conducting downward truncation on the probability distribution after the translation from a point valued 0 based on a fact that the minimum available power of the WVPG is 0, wherein if values of state 1 to state a of the probability distribution after the translation is less than 0, probability $\tilde{P}^*_{\varepsilon 0}$ corresponding to state 0 after the downward truncation is:

$$\tilde{P}''_{\varepsilon 0} = \tilde{P}'_{\varepsilon 0} + \sum_{i=1}^{a} \tilde{P}'_{\varepsilon,i} \qquad (5)$$

wherein $\tilde{P}'_{\varepsilon 0}$ denotes a probability of a multi-state distribution valued 0 before the truncation operation is performed at the point valued 0; if the distribution has no state valued 0 before the truncation, $\tilde{P}'_{\varepsilon 0}=0$;

b2: calculating available power limits, wherein the available power limits are the maximum and minimum available power of the WVPG at moment t; an upper limit of output of the thermal power unit is the installed capacity, and a lower limit of the output is the minimum stable combustion output, and the lower and upper limits are fixed values at all moments; the available power limits of the WVPG are upper and lower boundary values of the probability distribution at a certain confidence level, and vary with the probability distribution of the available power;

the upper limit of the available power of the WVPG at moment t is defined as formula (6) based on the value-at-risk theory:

$$p_{max}^{VPG}(t) = \min[a : P\{P_a^{VPG}(t) \leq a\} \geq \beta] \qquad (6)$$

wherein $p_{max}^{VPG}(t)$ denotes the upper limit (MW) of the available power of the WVPG at moment t; $\beta$ denotes a confidence probability; $p_{max}^{VPG}(t)$ means that it is assured with a probability higher than $\beta$ that the available power of the WVPG at moment t is less than or equal to a, and a minimum value of a is the upper limit of output;

the lower limit of the available power of the WVPG at moment t is defined as formula (7):

$$p_{min,k}^{VPG}(t) = \max[b : P\{p_{b,k}^{VPG}(t) \geq b\} \geq \beta] \qquad (7)$$

Wherein $p_{min,k}^{VPG}(t)$ denotes the lower limit (MW) of the available power of the WVPG at moment t; $p_{min,k}^{VPG}(t)$ means that it is assured with a probability higher than $\beta$ that the available power of the WVPG at moment t is greater than or equal to b, and a maximum value of b is the lower limit of the available power;

limit indexes of the available power are calculated as follows:

separately setting $\tilde{p}_{a|t,i}$, $\tilde{P}_{a|t,i}$ as an ith state value and state probability of multi-state probability distribution $\tilde{f}_{a|t}^{VPG}$, wherein using the upper limit of the available power as an example, if a cumulative probability corresponding to a bth state value of $\tilde{f}_{a|t}^{VPG}$ satisfies formula (8):

$$\sum_{i=1}^{b} \tilde{P}_{a|t,i} \leq \beta < \sum_{i=1}^{b+1} \tilde{P}_{a|t,i} \qquad (8)$$

the upper limit of the available power is defined as formula (9):

$$p_{max}^{VPG}(t) = \tilde{p}_{a|t,b} + (\tilde{p}_{a|t,b+1} - \tilde{p}_{a|t,b}) \frac{\left(\beta - \sum_{i=1}^{b} \tilde{P}_{a|t,i}\right)}{\tilde{P}_{a|t,b+1}} \qquad (9)$$

wherein $\tilde{p}_{a|t,b+1} - \tilde{p}_{a|t,b}$ denotes a difference between values of a (b+1)th state and the bth state, and $$\left(\beta - \sum_{i=1}^{b} \tilde{P}_{a|t,i}\right) \Big/ \tilde{P}_{a|t,b+1}$$

denotes a ratio of a difference between the confidence probability $\beta$ and a cumulative probability of the bth state to a difference between a cumulative probability of the (b+1)th state and that of the bth state;

b3: calculating an output adjustment range, wherein the output adjustment range includes output up/down-adjustment limits of the WVPG at moment t; an output adjustment range of the thermal power unit is determined by the upper and lower limits of the available power; an output adjustment range of the WVPG is determined by both the upper and lower limits of the available power and a control method;

an output up-adjustment limit $p_{r,max}^{VPH}(t)$ (MW) of the WVPG at moment t is equal to the upper limit $p_{max}^{VPG}(t)$ of the available power; the output down-adjustment limit is determined in the following two cases: when generator tripping is allowed, the output of the WVPG can be adjusted down to 0, and in this case, $p_{r,min}^{VPG}(t)=0$; when only pitch angle adjustment is allowed, a power down-adjustment limit (MW) of the wind power unit is set to be k % of the available power, and in this case, the output down-adjustment limit may be expressed as:

$$p_{r,min}^{VPG}(t) = k\% \, E(P_a^{VPG}(t)) \qquad (10); \text{ and}$$

b4: calculating a ramp rate, wherein a ramp rate of the thermal power unit is a fixed value, whereas a ramp rate of the WVPG is determined by output fluctuation of the WVPG and is an upper/lower boundary value of fluctuation probability distribution $\tilde{f}_{\Delta P|t}^{VPG}$ with a certain confidence probability; in addition, when determining a ramp rate limit of the WVPG in a dispatch model, it is further necessary to consider a restriction imposed by a dispatch procedure on a wind power fluctuation range allowed per unit time;

first, a ramp-up rate limit $r_{u1}^{VPG}(t)$ (MW/min) of the WVPG determined by output fluctuation at moment t is defined as shown in formula (11):

$$r_{u1}^{VPG}(t) = \min[a : P\{\Delta P^{VPG}(t) \leq a\} \geq \beta] \qquad (11)$$

wherein $\Delta P^{VPG}(t)$ denotes a random variable of output fluctuation of the WVPG at moment t; $\beta$ denotes the confidence probability; $r_{u1}^{VPG}(t)$ denotes the ramp-up rate limit of the WVPG determined by fluctuation at moment t, and is a positive value; formula (11) means that it is assured with a probability higher than $\beta$ that a fluctuation value is less than or equal to a, and a minimum value of a is the ramp-up rate limit determined by fluctuation;

a ramp-down rate limit $r_{d1}^{VPG}(t)$ (MW/min) of the WVPG determined by output fluctuation at moment t is defined as formula (12):

$$r_{d1}^{VPG}(t) = \max[b : P\{\Delta P^{VPG}(t) \geq b\} \geq \beta] \qquad (12)$$

wherein $r_{d1}^{VPG}(t)$ denotes the ramp-down rate limit of the WVPG determined by output fluctuation at moment t, and is a negative value; formula (12) means that it is assured with a probability higher than $\beta$ that a fluctuation value is greater than or equal to b, and a maximum value of b is the ramp-down rate limit determined by fluctuation;

considering both the ramp rate limits determined by output fluctuation and the restriction imposed by the dispatch procedure on the wind power fluctuation range allowed per unit time, the ramp-up and ramp-down rate limits of the WVPG in the dispatch model may be determined respectively by using formula (13) and formula (14);

the ramp-up rate limit of the WVPG is calculated as follows:

$$r_u^{VPG}(t)=\min[r_{u1}^{VPG}(t), r_{u2}^{VPG}(t)] \quad (13)$$

wherein $r_{u2}^{VPG}$ denotes the ramp-up rate limit (MW/min) of the WVPG determined by the dispatch procedure at moment t, and $r_u^{VPG}(t)$ denotes the ramp-up rate limit (MW/min) of the WVPG at moment t;

when $r_{u1}^{VPG}(t) < r_{u2}^{VPG}(t)$, it indicates that the ramp-up rate limit determined by fluctuation is lower than the restriction imposed by the dispatch procedure from moment t−1 to moment t; the ramp-up rate limit needs to be set to $r_u^{VPG}(t)=r_{u1}^{VPG}(t)$ to avoid overestimating a power rise rate;

when $r_{u1}^{VPG}(t) > r_{u2}^{VPG}(t)$, it indicates that the ramp-up rate limit determined by fluctuation is higher than the restriction imposed by the dispatch procedure from moment t−1 to moment t; the ramp-up rate limit needs to be set to $r_u^{VPG}(t)=r_{u2}^{VPG}(t)$ to prevent power from rising too fast;

the ramp-down rate limit of the WVPG is calculated as follows:

$$r_d^{VPG}(t)=\min[r_{d1}^{VPG}(t), r_{d2}^{VPG}(t)] \quad (14)$$

wherein $r_{d2}^{VPG}(t)$ denotes the ramp-down rate limit (MW/min) of the WVPG determined by the dispatch procedure at moment t, and is a negative value; $r_d^{VPG}(t)$ denotes the ramp-down rate limit (MW/min) of the WVPG at moment t, and is a negative value;

if $r_{d1}^{VPG}(t) < r_{d2}^{VPG}(t)$, it indicates that output determined by fluctuation drops too fast from moment t−1 to moment t, and the ramp-down rate limit needs to be set to $r_d^{VPG}(t)=r_{d1}^{VPG}(t)$ to avoid underestimating the ramp-down rate;

if $r_{d1}^{VPG}(t) > r_{d2}^{VPG}(t)$, it indicates that a downward fluctuation rate of output is less than a requirement of the dispatch procedure from moment t−1 to moment t; the ramp-down rate may be increased through a control method if necessary, and the ramp-down rate limit is set to $r_d^{VPG}(t)=r_{d2}^{VPG}$; and a ramp rate index is calculated as follows:

conducting quantile operation on the multi-state probability distribution $\tilde{f}_{\Delta P|t}^{VPG}$ of fluctuation of the WVPG at moment t to obtain the ramp-up and ramp-down rate limits $r_{u1}^{VPG}(t)$, $r_{d1}^{VPG}(t)$ determined by output fluctuation; and then obtaining values of the ramp rate limits of the WVPG at the current moment by using formula (13) and formula (14);

wherein the analysis method in step S3 comprises:

c1. variables c1.1. integer variables v(i,t): a variable that denotes an on/off state of unit i at moment t, wherein v(i, t)=1 indicates that unit i is on at moment t, and v(i, t)=0 indicates that unit i is off at moment t;

y(i, t): a variable that denotes a conversion state of unit i at moment t, wherein y(i, t)=1 indicates that unit i changes from the off state to the on state at moment t, and y(i, t)=0 indicates that the unit is in another state;

z(i, t): a variable that denotes the conversion state of unit i at moment t, wherein z(i, t)=1 indicates that unit i changes from the on state to the off state at moment t, and z(i, t)=0 indicates that the unit is in another state;

ω(i, t, j): a variable that denotes a downtime state of the unit, wherein ω(i, t, j)=1 indicates that unit i has been off for j hours at moment t, and ω(i, t, j)=0 indicates that the unit is in another state; and Tr(i,t): a variable valued 0 or 1 added to denote the startup time of a translatable load, wherein Tr(i, t)=1 indicates that translatable load i starts to operate at moment t, and Tr(i,t)=0 indicates that translatable load i does not start to operate at moment t;

c1.2. continuous variable p(i, t): output of unit i at moment t c2. objective function $$\underset{p(i,t),y(i,t)}{\text{Min}} \sum_{t=1}^{TT} \sum_{i=1}^{NG} [c(i, t) + b(i, t)] \quad (15)$$

wherein $c(i,t)=A(i) \times p(i,t)^2 + B(i) \times p(i,t) + C(i) \times v(i,t) \quad (16)$ wherein TT denotes total operation duration; NG denotes the number of units; A(i), B(i), C(i) respectively denote a quadratic coefficient, a linear coefficient, and a constant term in a quadratic function of power generation costs and output power of unit i; c(i, t) denotes power generation costs of unit i at moment t; b(i, t) denotes startup costs of unit i at moment t; calculation of b(i, t) is related to downtime of the unit before startup, and detailed calculation is described in constraints; shutdown costs is usually not considered because it has little impact on total costs;

c3. constraints c3.1. power balance constraint $$\sum_{i}^{NG} p(i, t) = D_0(t) + \sum_{i=1}^{NJ} PD(i, t) \forall t \in T \quad (17)$$

wherein PD(i, t) denotes a load value of translatable load i at moment t; $D_0(t)$ denotes a fixed system load at moment t; NI denotes the number of translatable loads; the sum of the fixed loads and the translatable load after translation matches the total output of the unit based on this constraint;

c3.2. constraint on upper and lower output limits of the unit $$\underline{p}(i,t) \times v(i,t) \geq p(i,t) \geq \overline{p}(i,t) \times v(i,t) \forall i \in G, t \in T \quad (18)$$

wherein $\underline{p}(i,t)$ denotes the lower output limit of unit i at moment t; $\overline{p}(i,t)$ denotes the upper output limit of unit i at moment t; G denotes a set of units; this constraint ensures that the units can operate in an output range for normal operation;

c3.3. constraints on startup/shutdown auxiliary variable $$y(i,t)+z(i,t) \leq 1 \forall i \in G, t \in T \quad (19)$$

$$y(i,t)-z(i,t)=v(i,t)-v(i,t-1) \forall i \in G, t \in T \quad (20)$$

wherein formula (19) imposes a restriction that prevents a unit from being started and shut down at the same time, and formula (20) restricts consistency between startup and shutdown actions and an operating state of the unit;

c3.4. constraints on minimum runtime $$\sum_{k=1}^{G(i)} [1 - y(i, k)] = 0 \quad (21)$$

$$\sum_{k=t}^{t+T_{up}(i)-1} v(i, k) \geq T_{up}(i) \times y(i, t) \forall\, t = G(i) + 1 LTT - T_{up}(i) + 1 \quad (22)$$

$$\sum_{k=t}^{TT} [v(i, k) - y(i, t)] \geq 0 \forall\, t = TT - T_{up}(i) + 2LTT \quad (23)$$

wherein $G(i) = \text{Min}[TT, (T_{up}(i) - T_0(i)) \times U_0(i)]$ denotes minimum runtime initially required by unit i after operation starts; $T_{up}(i)$ denotes minimum startup runtime of unit i; $U_0(i)$ denotes an initial operating state of unit i, and if $U_0(i)=1$, unit i is initially in operation, and if $U_0(i)=0$, unit i is initially in shutdown state; $T_0(i)$ denotes initial runtime or downtime of unit i, and is a positive number when it denotes the initial runtime and a negative number when it denotes the initial downtime; impact of an operating state at the end of a previous day on start of operation on a new day is mainly considered in formulas (22) and (23); if the unit is initially in operation, formula (22) indicates that the unit requires at least a runtime constraint formula (23) denotes a minimum runtime constraint in last $T_{up}(i)-1$ hours of runtime; if the unit starts in this time period, it needs to operate until the end of the day and cannot be shut down again;

c3.5. constraints on minimum downtime $$\sum_{k=1}^{L(i)} v(i, k) = 0 \quad (24)$$

$$\sum_{k=t}^{t+T_{down}(i)-1} [1 - v(i, k)] \geq T_{down}(i) \times z(i, t) \quad (25)$$

$$\forall\, t = L(i) + 1 \ldots TT - T_{down}(i) + 1$$

$$\sum_{k=t}^{TT} [1 - v(i, k) - z(i, t)] \geq 0 \forall\, t = TT - T_{down}(i) + 2 \ldots TT \quad (26)$$

wherein $L(i) = \text{Min}[TT, (T_{down}(i) + T_0(i)) \times (1 - U_0(i))]$, and it denotes minimum downtime initially required by unit i after operation starts; $T_{down}(i)$ down denotes minimum downtime of unit i; impact of an operating state at the end of a previous day on start of operation on a new day is mainly considered in formulas (25) and (26); if the unit is initially in shutdown state, it indicates that the unit requires at least a downtime constraint; formula (25) denotes a minimum downtime constraint each time unit i is shut down; formula (26) denotes a minimum downtime constraint in last $T_{down}(i)-1$ hours of runtime; if the unit is shut down in the time period, it needs to be in shutdown state until the end of the day and cannot be started again;

c3.6. ramp rate constraints $$p(i,t) - p(i,t-1) \leq RATEUP(i) \forall i \in G, t=2,3 \ldots TT \quad (27)$$

$$p(i,t-1) - p(i,t) \leq RATEDN(i) \forall i \in G, t=2,3 \ldots TT \quad (28)$$

wherein RATEUP(i) denotes a ramp-up rate of unit i, that is, a rate at which output of unit i increases; RATEDN(i) denotes a ramp-down rate of unit i, that is, a rate at which output of unit i decreases; an output change between two adjacent time periods is limited because the output of the unit is adjusted at a limited rate; and the ramp rate constraint represents this limitation;

c3.7. downtime counter constraints $$S(i,t) \leq S(i,t-1) + 1 \forall t \in T$$

$$S(i,t) + (TT+1) \times v(i,t) \geq S(i,t-1) + 1 \forall t \in T$$

$$S(i,t) - TT \times [1 - v(i,t)] \leq 0 \forall t \in T$$

$$S(i,t) \geq 0 \forall t \in T \quad (29)$$

wherein S(i, t) is a downtime count variable that denotes accumulated consecutive downtime of unit i at moment t; it is necessary to use the constraint to record downtime because startup costs in the model are segmented and related to the downtime of the unit; a function implemented by the four constraints is as follows: when $v(i, t)=0$, $S(i,t)=S(i, t-1)+1$, and when $v(i, t)=1$, $S(i, t)=0$, thereby implementing accumulation of consecutive downtime;

c3.8. constraints on segmented startup costs $$b(i, t) = \sum_{j=1}^{ND} UPcost(i, j) \times \omega(i, t, j) \forall\, t \in T \quad (30)$$

$$\sum_{j=1}^{ND} \omega(i, t, j) = y(i, t) \forall\, t \in T$$

$$S(i, t-1) = \sum_{j=1}^{ND-1} j \times \omega(i, t, j) + m(i, t),\ \forall\, t \in T$$

$$m(i, t) \leq TT \times [\omega(i, t, ND) - y(i, t) + 1] \forall\, t \in T$$

$$m(i, t) \geq ND \times \omega(i, t, ND) \forall\, t \in T$$

wherein in these constraints, segmented startup costs b(i, t) are calculated by using a counter of consecutive downtime; UPcost(i, j) denotes startup costs after unit i is shut down for j hours; longer downtime usually indicates higher startup costs, and the startup costs no longer change after the unit is shut down for a certain time period; ND denotes a time threshold that finally allows the startup costs to stop changing in segmented startup costs calculation; $\omega(i, t, j)$ is a variable valued 0 or 1 that denotes a downtime state of the unit, wherein $\omega(i, t, j)=1$ indicates that unit i has been shut down for j hours at moment t, and $\omega(i, t, j)=0$ indicates that the unit is in another state; in this constraint, for each time period of each unit, at most one $\omega(i, t, j)$ can be set to 1; in formula (30), dummy variable m(i, t) is used to associate consecutive downtime count S(i, t) with $\omega(i, t, j)$;

c3.9. constraint on period-based load translation $$PD(i, t) = \sum_{j=1}^{T_0} [Tr(i, t-j+1) \times D_{tr}(i, j)] \forall\, i \in NI, t \in NT(i) \quad (31)$$

$$\sum_{t=1}^{TT} Tr(i, t) = 1,\ \forall\, i \in NI$$

-continued $$\sum_{t=TT-NT(i)+1}^{TT} Tr(i, t) = 0, \forall i \in NI$$

wherein $T_0$=min[t, NT(i)]; $D_{tr}(i, j)$ denotes a load value of a jth segment in a load sequence of translatable load i; NT(i) denotes a time length of the sequence of translatable load i; and NI denotes a set of sequence numbers of translatable loads;

controlling power output of the WVPG to a power system based on the source-load peak-shaving resource strategy.

* * * * *